United States Patent Office 3,136,729
Patented June 9, 1964

3,136,729
CATALYST COMPOSITIONS AND PROCESS OF PREPARATION
Alfred Clark, Bartlesville, Okla., assignor to Phillips Petroleum Company, a corporation of Delaware
No Drawing. Filed June 16, 1960, Ser. No. 36,485
12 Claims. (Cl. 252—428)

This invention relates to novel catalyst compositions and a process for preparing them. In another aspect it relates to compositions comprising free radicals trapped in a solid matrix. In still another aspect, it relates to a process for generating and trapping free radicals with a solid support of the silica-alumina type.

Free radicals are usually formed by breaking chemical bonds, and thus they will normally be formed in pairs. Free radicals have been described as atoms or molecules which are electrically neutral while almost always having an odd number of electrons. For example, atomic hydrogen has one electron and the methyl radical has nine. The unpaired electron accounts, in part, for the high reactivity and very short life of free radicals. The unpaired electron seeks a more stable condition by pairing with another odd (unpaired) electron. Therefore, high concentrations of free radicals are difficult to obtain.

Several studies have been made in an effort to trap and identify organic free radicals in various matrices. Since free radicals represent a concentrated source of energy and are important as catalysts, and have other purposes, there have been suggested various means for the production and trapping (storage) of these reactive species. For example, it is known that some free radicals can be generated in an electrical discharge, or produced by irradiation, and subsequently trapped by condensing at temperatures of liquid helium (4.2° K.).

In the prior art, the solid free radical precursor is first irradiated with gamma rays to bring about dissociation and formation of radicals. Moreover, most of the successful trapping of radicals so far has been at 4 to 20° K., a temperature very difficult and expensive to achieve. The trapping agents employed have been characterized by rather weak matrix binding forces. It would be advantageous if free radical trapping would be effected at higher and hence more economical temperatures in order to achieve wider commercial applications for free radicals. This invention relates to a process by which free radicals are generated, trapped, and stabilized at atmospheric temperatures. In another aspect this invention relates to generation of solid compositions which exhibit electron spin resonance.

Briefly, I have discovered that certain organic compounds are precursors of free radicals which are generated when solutions of said compounds are contacted with selected matrix material. The electron spin resonance of the solid is thereby increased. The free radicals are generated by contact with a suitable electron-accepting solid support, such as silica-alumina. The solid sorbs the precursor by reaction between unpaired electron, within the precursor and active sites on the solid and strains the precursor molecule such that the molecule breaks. The free radicals are then held by bonds to the matrix. The new solid may be freed of excess solvent to produce a solid composition containing trapped free radicals, as characterized by increased electron spin resonance.

Thus, in another way, this invention may be looked upon as a means of converting certain adsorbents to solids characterized by enhanced electron spin resonance. The solids, comprising the trapped free radicals, before or after removal of solvent, are effective catalysts for reactions induced by free radicals, as for example, polymerization.

It is, therefore, an object of this invention to provide novel catalyst compositions comprising free radicals trapped in a solid matrix and a process for preparing the same.

It is another object of this invention to provide a method of generating, trapping, and stabilizing free radicals at relatively elevated temperatures by the use of a selected matrix, and selected free radical precursors.

A still further object is to provide a process for generating and trapping free radicals with a solid support of the silica-alumina type.

Various other objects, advantages and features of this invention will become apparent to those skilled in the art without departing from the scope and spirit of this invention, and it should be understood that the latter is not necessarily limited to the aforementioned disclosure.

The free radical precursors which are employed are organic compounds characterized by having unpaired electrons on two atoms in the molecule. Compounds which have been discovered to be particularly suitable are characterized by the following structure:

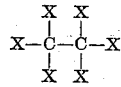

wherein each X is a halogen selected from the group fluorine, chlorine, bromine and iodine. Examples of these compounds which are employed are: hexachloroethane, hexafluoroethane, hexabromoethane, and hexaiodoethane. Also, the compounds benzoyl peroxide, tetraphenylhydrazine, and symmetrical diphenylhydrazine are preferred free radical precursors.

Solutions of these compounds can be prepared with any suitable, non-deleterious solvent. Preferred solvents are the hydrocarbons containing from 5 to 10 carbon atoms such as the alkanes, the naphthenes, and the aromatic hydrocarbons. Examples of suitable diluents are illustrated by the following: pentane, hexane, heptane, 3-ethylhexane, octane, 2-methyloctane, decane, 2,7-dimethyloctane, cyclopentane, cyclohexane, methylcyclohexane, cyclooctane, benzene, toluene, xylene and the like. Of course, mixtures of these compounds are frequently employed since suitable mixtures are produced by conventional refinery operations.

The concentration of the free radical precursor in the solution is frequently in the range of 0.001 to 2 moles per liter of solution. The amount of solution which is employed is generally sufficient to saturate the solid and to provide the desired amount of precursor. The more useful compositions result from use of about 0.005 to 1 gram, and more preferably from 0.001 to 0.5 gram of the precursor per gram of the solid support.

The solids which are used for trapping of free radicals by the process of this invention are preferably porous solids of the silica-alumina type and contain from about 2 to about 70 parts by weight of alumina ($Al_2O_3$), or correspondingly from about 98 to about 30 parts by weight silica (SiO$_2$). Thus, the silica to alumina weight ratio is in the range of about 49 to 0.43. These preferred compositions are further characterized by having a protonic acidity of about 5 to about 100 milliequivalents per 100 grams. The protonic acidity is measured by the exchange capacity by any suitable procedure. One suitable method involves exchange with a neutral 0.1 N ammonium acetate solution as described by Holm, Bailey and Clark, Journal of Physical Chemistry, vol. 63, pages 129–133, February 1959. Other methods can be applied.

These preferred solids are further characterized by the fact that they are employed in the free acid form, i.e., hydrogen is the sole replaceable cation. Exchangeable cations other than hydrogen are removed by washing with a dilute mineral acid, such as hydrochloric or nitric acid. Any free acid is then washed out with water. The support is dried and activated.

Still other solids can give useful results but are frequently not as effective for trapping, as measured by the electron spin resonance. For example, a silica or an alumina is less effectvie than a silica-alumina having the preferred composition described above.

Various methods are known for preparation of suitable silica-alumina compositions of high surface area and porosity. Many of the products are commercially available. One method of preparation involves mixing a solution of sodium silicate with a solution of sodium aluminate. A gel forms and it is washed free of electrolyte. The gel is converted to the hydrogen form, as described above, by washing with acid.

The solid trapping material is pretreated or preactivated prior to contacting with the free radical precursor. Pretreatment involves removal of free water and sorbed gases, by heating at a temperature in the range of about 350° F. to 1600° F. For many silica-aluminas, temperatures of about 400 to 1100° F. are preferred. Heating in an atmosphere of dry gas, such as air, hydrogen, helium, nitrogen, argon, and the like, for a period of about 0.1 to 100 hours is adequate. Preactivation can also be effected in vacuum. Pressure as low as 10$^{-8}$ mm. of mercury can be obtained with commercially available equipment. One or more treatments can be applied serially. For example, the catalyst can be heated in dry air, in hydrogen, in vacuum, in nitrogen and in hydrogen, respectively, at a fixed temperature or at varying temperatures within the disclosed range. The activated product may be stored in vacuum or under a dry, inert atmosphere prior to contacting with the free radical precursor.

After pretreatment or activation of the solid trapping material it is contacted with the free radical precursor. This is effected in a dry, oxygen-free atmosphere or in vacuum. For example, the solid can be contained in a suitable vessel which is evacuated and connected by means of a valve to a solution of the free radical precursor. The solution is admitted to the vessel and mixed with the solid. In another method, the solution is placed in a vessel and frozen. The vessel is charged with the solid while maintaining the solution in the frozen condition. The vessel is then evacuated and sealed. The solution is then melted to permit mixing with the solid. These and many other simple and adequate procedures will be evident to one skilled in the art upon reading this disclosure.

The temperature at which contact between the solution and the solid is made, is above the freezing point of the solution and commonly between about 0° C. (32° F.) and to as high as 200° C. (392° F.). The contact time can be important. For some cases, the contact time need be only momentary, e.g., 1–10 seconds, and only sufficient to insure good mixing. In other cases the development of electron spin on the solid is time dependent and increases with time. For such cases the contact time can be increased to several hundred hours.

The mixture obtained by contacting the precursor in solution and the solid can be employed, for example, as a polymerization catalyst. However, the solid, which is characterized by enhanced electron spin resonance by virtue of contact with the solution, can be recovered to produce compositions useful in other areas, e.g., as catalyst for free-radical initiated reactions other than polymerization. Recovery of the solid can be effected by any suitable technique. For example, exess solution can be removed by decantation, filtration, or centrifugation. The moist solid can be dried to remove solvent. Vacuum distillation to remove solvent is effective.

The phenomena of electron spin resonance has been previously described in the literature. A general review of this property has been given by D. J. E. Ingram in his book, "Free Radicals as Studied by Electron Spin Resonance." (See especially pages 16–134.) The equipment and the method for computing the electron spin resonance which were employed for the examples have been summarized by R. L. Collins et al. in Journal of Applied Physics, vol. 30, No. 1, 56–62, January 1959, and the Review of Scientific Instruments, vol. 30, No. 6, 492, June 1959. Briefly, the method involves placing the candidate material at the center of a TE$_{102}$ transmission cavity positioned between the poles of the electromagnet. A klystron operating near 10,000 mc./sec. is used for the microwave source. The magnetic field is varied and modulated at 15 c.p.s. to permit use of phase-sensitive detection. A spectrometer is used to obtain transitions between Zeeman energy levels between unpaired electrons in the microwave region. The relative spin concentration was obtained from the curves obtained by calculation of the product of the amplitude (in arbitrary units) times the square of the line width (in Gauss).

In carrying out a polymerization using the free-radical containing solids of this invention, a solution of the monomer in a suitable solvent is contacted with the free-radical containing solid at a temperature within the range from 0° C. to 100° C., for a period of time ranging between 1 and 48 hours. The pressure during the period of polymerization is not critical, but it should be sufficient to maintain the monomer and the solvent, or the mixture of solvents, in a liquid state. Generally, pressures from 1 to 50 atmospheres will be employed. Preferred solvents for the polymerization reaction are the same as those solvents listed hereinbefore for dissolving the free-radical precursors prior to their being contacted with a solid support.

Some examples of monomers which can be polymerized either alone or copolymerized in accordance with the process of this invention comprises unsaturated organic compounds which generally contain the characteristic structure CH$_2$=C< and, in most cases, have at least one of the disconnected valences attached to an electronegative group, that is, a group which increases the polar character of the molecule such as a chlorine group or an organic group containing a double or triple bond such as vinyl, phenyl, cyano, carboxy or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene (2-chloro-1,3-butadiene), bromoprene, methylchloroprene (2-chloro-3-methyl-1,3-butadiene), and the like; aryl olefins such as styrene, various alkyl styrenes, p-chlorostyrene, p-methoxystyrene, alpha-methylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinyl acetate, vinyl chloride, vinylidene chloride, vinylfurane, vinylcarbazole, vinylacetylene and other unsaturated hydrocarbons, esters, alcohols, acids, ethers, etc. of the types described.

EXAMPLE I

Silica-Alumina Support and Tetraphenyl Hydrazine as Precursor

An activated support was prepared from a commercial silica-alumina having an $SiO_2/Al_2O_3$ weight ratio of 87/13. The support was activated by heating at 950° F. for 18–24 hours. A fluidized bed technique was employed for activation, the gas being hydrogen, air, oxygen, or nitrogen as indicated in Table I. The activated support was contacted with a 0.1 molar solution of tetraphenylhydrazine in benzene. The amount of solution employed for runs 4, 3 and 2 was sufficient to provide 2870, 2760, and 3030 grams, respectively, of the activated support per mol (336 grams) of tetraphenylhydrazine. For control run No. 1 the support was contacted with benzene solvent only. The electron spin resonance of the solid phase in contact with the benzene solution was determined immediately and after a 24-hour period. The results presented in Table I show that the support has no electron spin resonance. For runs 2, 3, and 4, the relative activity is in the range of 76 to 100.

TABLE I.—SILICA-ALUMINA SUPPORT AND TETRAPHENYLHYDRAZINE AS PRECURSOR

| Run No. | Support | Activation atmosphere | Grams support per mol tetraphenyl hydrazine | Relative activity | |
|---|---|---|---|---|---|
| | | | | Initial | 24 hr. |
| 4 | SA | Hydrogen | 2,870 | 78 | 76 |
| 3 | SA | Air | 2,760 | 100 | 83 |
| 2 | SA | Oxygen | 3,030 | 97 | 77 |
| 1 | SA | Hydrogen | None | None | None |

EXAMPLE II

Silica or Alumina as Support and Tetraphenyl Hydrazine as Precursor

Runs were made in the manner described for Example I except that the support was a commercial gamma alumina or a commercial silica. The gamma alumina was activated at 950° F. in a nitrogen atmosphere, and the silica in air. The results for the electron spin resonance developed by the solid phase were as follows:

| Support | Grams support per mole tetraphenyl hydrazine | Relative activity | |
|---|---|---|---|
| | | Initial | 24 hr. |
| Alumina | 6,670 | 5 | 13 |
| Silica | 4,080 | 2 | 1.5 |

These results show that the silica and the alumina are much less effective than the silica-alumina type of support of Example I.

EXAMPLE III

Silica-Alumina Support and Hexachloroethane as Precursor

The silica-alumina described in Example I was activated by heating at 950° F. The gaseous atmospheres employed for activation were as follows: air for 24 hours; nitrogen for 1 hour; hydrogen for 3 hours. Finally, the solid was cooled to room temperature in an atmosphere of nitrogen. The activated support was contacted with hexachloroethane in benzene solution. The solution concentration for each test is reported in Table II. The solution employed was placed in a glass tube, and frozen by immersion of the tube in a Dry Ice bath. The tube was evacuated while maintaining Dry Ice temperature. The activated silica-alumina was then put in the tube under vacuum. The tube was then sealed and warmed to room temperature (70–80° F.) and the contents were mixed. The electron spin resonance developed by the silica-alumina solid phase was measured after periods of 0, 5, 27 and 320 hours. The initial values were also zero. The results are presented in Table II.

TABLE II.—SILICA-ALUMINA SUPPORT AND HEXACHLOROETHANE AS PRECURSOR

| Moles precursor per $10^4$ grams silica-alumina | Concentration of precursor solution | Relative spin | | | |
|---|---|---|---|---|---|
| | | Initial | 5 hr. | 27 hr. | 320 hr. |
| 0.9 hexachloroethane | 0.011 | 0 | | 0.9 | 1.5 |
| 8.5 hexachloroethane | 0.10 | 0 | | 1.7 | 1.97 |
| 117 hexachloroethane | 1.0 | 0 | 2.15 | 2.7 | 3.17 |

EXAMPLE IV

Silica-Alumina Support and Benzoyl Peroxide Precursor

This example demonstrates the catalytic activity of the solid prepared by contact of benzoyl peroxide with an activated silica-alumina. The silica-alumina, described in Example I, was activated by heating at 950° F. first in an atmosphere of air for 4 hours, then in nitrogen for 1 hour, in hydrogen for 2 hours, and finally in nitrogen for 16 hours.

This activated support was contacted with a 0.1 molar solution of benzoyl peroxide in benzene and the electron spin resonance was measure at intervals over a several day period. The signal strength of the solid phase increased to a maximum value in about 18 hours. However, a 0.1 molar solution of benzoyl peroxide in benzene shows essentially zero spin resonance.

EXAMPLE V

Polymerization of Styrene

The activated silica-alumina described in Example IV was contacted with a 0.01 molar solution of benzoyl peroxide so as to provide 0.16 mole of the peroxide per 10,000 grams of the activated support. Details of the method of contacting and the polymerization of styrene with the catalyst mixture were as follows.

A 6.0 mm. diameter glass tube was immersed in a Dry Ice bath and charged with 0.5 cc. of styrene. The frozen styrene was covered with a layer of benzene. The precursor solution, 0.1 molar benzoyl peroxide was then added and covered with benzene. The total amount of benzene used in formation of protective layers was 0.1 cc. The activated silica-alumina in an amount between 0.10 and 0.12 gram was added last and the tubes were sealed. The reaction mixture was warmed to 24° C. and maintained at that temperature for about 1.5 hours. The contents of the reaction tubes were diluted by addition of about 50 cc. of methyl alcohol. The polymer which precipitated was recovered and dried in a vacuum oven at 100° C. The weight of the product, corrected for catalyst weight, was used to compute the yield of polymer.

The results are summarized in Table III. Runs No. 1 and 3 are control runs to show the lesser effectiveness of either the activated silica-alumina or benzoyl peroxide alone. Run 2 shows the enhanced effect atttributed to the contact of the silica-alumina with the benzoyl peroxide solution. Maximum activity was shown for the solid contacted with 0.16 mol of benzoyl peroxide per $10^4$ grams of the silica-alumina.

TABLE III.—POLYMERIZATION OF STYRENE IN BENZENE SOLUTION AND IN THE PRESENCE OF FREE RADICALS OBTAINED BY CONTACT OF BENZOYL PEROXIDE WITH SILICA-ALUMINA AT 24° C. FOR 1.5 HOURS

| Run No. | Mols precursor per $10^4$ gm. silica-alumina | Grams polymer per gram catalyst |
|---|---|---|
| 1 | 0 | 13.3 |
| 2 | 0.16 | 14.75 |
| 3 | Benzoyl peroxide; no support. | 0.3 |

The styrene polymerization described in Example V was carried out by exactly the same procedure, except hexachloroethane was substituted for the benzoyl peroxide of Example V. The results of these four runs, two taken at each of two temperatures, are expressed below in the form of Table IV.

TABLE IV.—POLYMERIZATION OF STYRENE IN BENZENE SOLUTION AND IN THE PRESENCE OF FREE RADICALS OBTAINED BY CONTACT OF HEXACHLOROETHANE WITH SILICA-ALUMINA, AT 25° C. AND 85° C. FOR 1.5 HOURS

| Run No. | Mols precursor per $10^4$ gm. Si-Al | Grams of polymer/ gram catalyst |
|---|---|---|
| At 25° C. | | |
| 1 | 0.23 | 25.7 |
| 2 | 13.57 | 19.3 |
| At 85° C. | | |
| 3 | 0.23 | 221 |
| 4 | 15.07 | 284 |

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. A free-radical containing solid comprising a major amount of a trapping matrix selected from the group consisting of silica, alumina, and silica-alumina, and a minor amount of free radicals resulting from the dissociation of a compound selected from the group of compounds consisting of tetraphenylhydrazine, symmetrical diphenylhydrazine, and compounds of the formula:

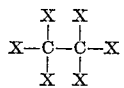

and wherein each X is a halogen selected from the group fluorine, chlorine, bromine and iodine.

2. A composition according to claim 1 wherein said compound is hexachloroethane.

3. The process of preparing a polymerization catalyst which comprises contacting a solid matrix selected from the group consisting of silica-alumina, alumina, and silica, with a solution of at least one compound selected from the group of compounds consisting of: benzoyl peroxide, tetraphenyl hydrazine, symmetrical diphenyl hydrazine, and compounds of the formula:

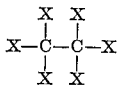

wherein each X is a halogen selected from the group fluorine, chlorine, bromine and iodine, in a hydrocarbon solvent.

4. A process according to claim 3 wherein said hydrocarbon solvent is benzene.

5. A process preparing a polymerization catalyst which comprises contacting a porous solid material selected from the group consisting of silica, alumina, and silica-alumina with a dilute mineral acid to substantially remove exchangeable cations other than hydrogen therefrom, heating the said porous solid in a temperature range of about 400–1100° F. in a first dry atmosphere for a period of time sufficient to substantially remove free water and sorbed gases, dissolving a free radical precursor selected from the group consisting of tetraphenylhydrazine, symmetrical diphenylhydrazine, and compounds of the formula:

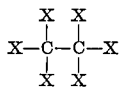

wherein each X is a halogen selected from the group fluorine, chlorine, bromine and iodine dispersed in a nonpolar hydrocarbon solvent, contacting the resulting solution with said solid porous material in a second oxygen-free dry atmosphere for a sufficient time and in an amount sufficient to saturate the said solid material to thereby provide the desired amount of said precursor, removing the excess solution, and drying the moist solid to substantially remove adsorbed solvent, the resulting compound having trapped free radicals adsorbed thereon as measured by the electron spin resonance.

6. A process according to claim 5 wherein said dilute mineral acid is selected from the group consisting of hydrochloric acid and nitric acid.

7. A process according to claim 5 wherein said first dry atmosphere is selected from the group consisting of air, hydrogen, helium, nitrogen and argon.

8. A process according to claim 5 wherein said hydrocarbon solvent is selected from the group consisting of pentane, hexane, heptane, 3-ethylhexane, octane, 2-methyloctane, decane, 2,7-dimethyloctane, cyclopentane, cyclohexane, methylcyclohexane, cyclooctane, benzene, toluene, and xylene.

9. A process according to claim 5 wherein said second dry atmosphere is selected from the group consisting of hydrogen, helium, nitrogen and argon.

10. A process according to claim 5 wherein said free radical precursor is dispersed in said hydrocarbon solvent in a concentration ranging from 0.001 to 2 mols per liter of solvent.

11. A process according to claim 5 wherein said period of time sufficient to remove free water and sorbed gases is in the range of between 0.1 to 100 hours.

12. A process according to claim 5 wherein said sufficient contacting time to saturate said solid material is in the range of 1 second to 300 hours.

References Cited in the file of this patent

UNITED STATES PATENTS

| 2,557,256 | Brubaker | June 19, 1951 |
| 2,593,098 | Burt | Apr. 15, 1952 |
| 2,715,118 | Grim | Aug. 9, 1955 |
| 2,815,332 | Grosser | Dec. 3, 1957 |
| 2,895,919 | Gerhart | July 21, 1959 |
| 2,963,471 | Herman | Dec. 6, 1960 |

OTHER REFERENCES

O'Connor et al.: "Ind. and Eng. Chem.," volume 51, No. 4, April 1959, pages 531–534.

Broida: "Endeavour," volume 17 (1958), pages 208–15.